Patented Sept. 7, 1948

2,448,970

UNITED STATES PATENT OFFICE 2,448,970

PRESERVING TINNED CRUSTACEAN MEAT

James J. Ganucheau, New Orleans, La., assignor to Southern Shell Fish Company, Inc., New Orleans, La., a corporation of Louisiana No Drawing. Application March 19, 1946, Serial No. 655,600

4 Claims. (Cl. 99—188)

My invention relates to the preservation of certain natural characteristics of crab meat and the meat of other crustaceans when the latter is canned or tinned.

The primary object of my invention is to provide a so-called regulating mixture which will preserve the natural flavor and appearance or color of such meats when the latter are immersed therein in a can or other tinned container.

Still another object is to provide a regulating mixture which will possess a substantially continuous buffer action over a large range of acidity occurring in different meats naturally or by reason of the method used in preparing the same for canning, thus providing a greater margin of safety for variations in the meat being canned.

More specifically, the invention contemplates the use of a mixture consisting of certain common salts, sodium chloride and disodium phosphate, and an organic acid such as citric acid, the disodium phosphate and citric acid being mixed with a brine solution and the meat in the can covered with the mixture before the can is closed and processed for sterilization, said mixture being capable of maintaining a hydrogen-ion concentration of 4. to 6.05 pH in the canned meat.

The brine solution or the sodium chloride in water solution is used as a base liquor in which to dissolve the disodium phosphate and the citric acid and I have found that the strength of this salt solution may be varied from 5% to 7% of common salts. The proportions in which the disodium phosphate and citric acid are used in this salt solution will also vary with the characteristics of the raw material, the crab meat or the like. For instance, should the acidity of the crab meat or other raw material be such as to require the use of a regulating mixture having a pH of 4.6 I use the disodium phosphate and citric acid in substantially the proportions of 467.5 ml. of 0.2 M disodium phosphate and 532.5 ml. of 0.1 M citric acid to each liter of mixture. I may vary the amount of these ingredients by using a different multiple thereof. For instance, I may use 0.4 molar disodium phosphate and 0.2 molar citric acid, using the same number of ml. to make one liter of solution. Again, should the characteristics of the raw meat be such that a different pH is required the proportion of disodium phosphate and citric acid are varied, a pH of 5.6 being attained by mixing 580 ml. of 0.2 M disodium phosphate and 420 ml. of 0.1 M citric acid to the liter. Incidentally, I find that the strength of the common salt used as a base for this mixture has little effect on the canned article. These examples are given primarily for the purpose of indicating the proportions that may be used for obtaining regulating mixtures having a different pH. However, for actual commercial use in plant operation the regulating mixture has been prepared by dissolving 11.2 ounces of disodium phosphate and 7.6 ounces of citric acid in each 5 gallons of brine containing 5% salt. The sequence in which the several ingredients are combined may be varied. This mixture of salts in solution is introduced into the tins or cans in sufficient quantities that the liquor or solution will cover the crab meat or other raw meat in the can. The can is then exhausted, closed and processed in the usual way but as these steps of exhausting, closing and processing are carried out in accordance with the common practice followed in the art today such steps need not be here described in detail. It should also be added that the method of blanching the crabs or other crustacean, whether they are steamed or boiled in water and the method used for picking the meat form no part of the present invention, any ordinary methods heretofore used being entirely feasible so far as the present method is concerned.

The use of the particular salts referred to in making my regulating mixture results in several well defined advantages. For instance, I have found that mixtures of these salts and citric acid exert a buffering action on the natural juice or liquor of the crab meat or other crustacean and keep them to the desired hydrogen-ion concentration which I have found to be between 4. and 6.5 pH. I have indicated certain proportions of the salts that may be used for different acidities and it will be understood that the several ingredients are to be used within the limits mentioned, i. e., to maintain the hydrogen-ion concentration of between 4. and 6.5 pH. Due to the particular salts used in my regulating mixture a continuous buffering action is obtained over a wide range so that this particular mixture gives a greater margin of safety in the raw meats. It is also true that by the particular combination of salts and citric acid used a marked effect is produced in that the natural flavor of the raw meat is preserved or fully retained in the canned or tinned product. I also find natural shrinking or swelling of the canned or tinned meat is avoided. Furthermore, the phosphate salt when combined with the citric acid has a binding effect on the iron present in crab meat and any other metal that may be present such as copper also retains its original color and, as a result, the canned or tinned meat does not appear grey or blue as would be the case if this particular combination of salts and acid were not used. In other words, crab or other crustacean meat covered with my regulating mixture and sealed in the can faithfully retains its natural color or normal, fresh natural appearance.

What I claim is:

1. The method of canning the meat of crabs and other crustaceans which consists in depositing the meat in a can, depositing in the can a regulating mixture of a solution of common salt containing disodium phosphate and citric acid to cover the meat in the can, said mixture having a hydrogen-ion concentration between 4 and 6.5 pH, and thereafter sealing the can and subjecting the same to a sterilizing temperature.

2. The method of canning meat of crabs and other crustaceans, the step which consists in adding to the container a regulating mixture comprising common salt, disodium phosphate and citric acid in sufficient quantity to immerse the meat in the container, said mixture having a hydrogen-ion concentration between 4 and 6.5 pH, whereby the canned meat substantially retains its natural flavor and appearance.

3. A regulating mixture for preserving the flavor and appearance of canned meat of crabs and other crustaceans immersed in the mixture in a can, said mixture consisting of a five to seven percent solution of sodium chloride containing disodium phosphate and citric acid in proportions to produce a hydrogen-ion concentration of 4 to 6.5 pH.

4. A regulating mixture for preserving the flavor and appearance of canned meat of crabs and other crustaceans immersed in the mixture in a can, said mixture consisting of a brine containing five percent sodium chloride as a base and disodium phosphate and citric acid dissolved therein in proportions of approximately 11.2 oz. of disodium phosphate and 7.6 oz. of citric acid to each five gallons of brine.

JAMES J. GANUCHEAU.

REFERENCES CITED

The following references are of record in the file of this patent:

UNITED STATES PATENTS

| Number | Name | Date |
|---|---|---|
| 1,686,393 | Oshima | Oct. 2, 1928 |

OTHER REFERENCES

Dept. of Commerce, Bureau of Fisheries, Mem. S–236 "Prevention of Blackening in Canned Lobster."